United States Patent [19]

Heitz et al.

[11] 4,115,616

[45] Sep. 19, 1978

[54] SELF-SEALING FUEL LINE ASSEMBLY

[75] Inventors: Roger M. Heitz, Palos Verdes Estates; Franklin Hill, Van Nuys, both of Calif.

[73] Assignee: The United States of America as represented by the Secretary of the Air Force, Washington, D.C.

[21] Appl. No.: 876,445

[22] Filed: Feb. 9, 1978

[51] Int. Cl.² ............................................. B32B 3/26
[52] U.S. Cl. ................................. 428/310; 428/413; 428/419; 428/474; 428/911; 428/912
[58] Field of Search ............... 428/310, 413, 419, 474, 428/911, 912

[56] References Cited

U.S. PATENT DOCUMENTS

| | | | |
|---|---|---|---|
| 1,386,791 | 8/1921 | Murdock | 220/63 R |
| 3,509,016 | 4/1970 | Underwood et al. | 428/425 |
| 3,536,576 | 10/1970 | Schwartz | 428/912 |
| 3,654,057 | 4/1972 | Olevitch | 428/458 |
| 3,698,587 | 10/1971 | Baker et al. | 428/912 |
| 3,722,355 | 3/1973 | King | 428/911 |
| 3,787,279 | 1/1974 | Winchester | 428/912 |
| 4,057,359 | 11/1977 | Grooman | 428/911 |

*Primary Examiner*—William J. Van Balen
*Attorney, Agent, or Firm*—Joseph E. Rusz; William J. O'Brien

[57] ABSTRACT

A self-sealing multi-laminated fuel line composite material composed of (a) a plastic fuel line, (b) a precompressed and fuel sensitive foam bonded to said plastic line, and (c) a flexible, plastic laminate bonded on top of said foam.

3 Claims, 1 Drawing Figure

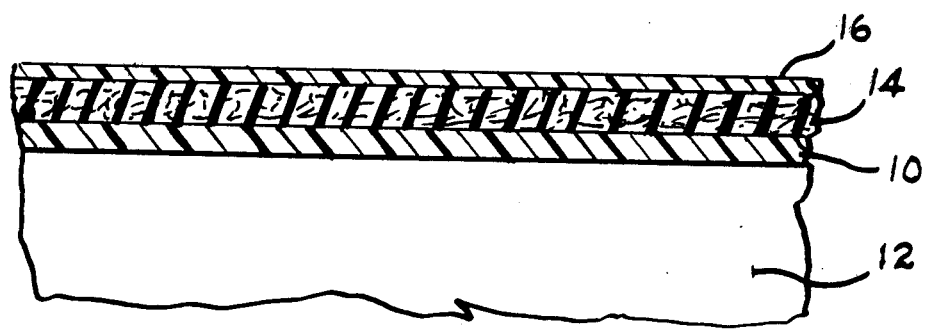

SELF-SEALING FUEL LINE ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates to a new and improved self-sealing fuel line. More particularly, this invention concerns itself with a multi-laminated, self-sealing fuel line assembly adapted for protection against .30 caliber AP and .50 caliber AP projectiles.

Limited war operations have demonstrated that a considerable hazard still exists from small arms and antiaircraft ground fire. Penetration of an aircraft fuel system by a 20 mm or smaller projectile can produce fuel leaks leading to fuel starvation, fires, explosions, or catastrophic destruction of an aircraft. In the past, the bulk of the effort in the area of self-sealing fuel lines has been devoted to the development of self-sealing protective covers for metallic fuel lines which tend to flower or petal when punctured by a projectile. Although some success has been realized at the .50 caliber level threat, the conventional protective cover approach has not proved entirely satisfactory. Because of this flowering tendency of metallic fuel lines, more sealant must be applied than would be required if petalling did not occur; consequently, excessive weight and volume penalties have resulted.

In an attempt at minimizing the problems associated with previous self-sealing techniques, an exploratory development program and coordinated research effort evolved which resulted in the development of a multilaminated self-sealing plastic fuel line assembly. This assembly does not flower when punctured and provides protection against .30 and .50 caliber AP projectiles penetrating at norml incidence; and .30 caliber AP projectiles penetrating at normal incidence and in the fully tumbled condition.

SUMMARY OF THE INVENTION

In accordance with the general concept of this invention, there is provided a novel, self-sealing plastic fuel line assembly that does not flower when punctured by armor piercing, small caliber projectiles. Normally, standard metal fuel lines will flower heavily when impacted by small arms fire. The heavy flowering prevents a fuel line self-sealing system from functioning properly, leading to large losses of fuel and the subsequent disabling of aircraft subjected to small arms antiaircraft fire. The importance of overcoming the flowering problem becomes obvious when one realizes that limited war operations, such as guerilla type harassment and sabotage actions, can still be encountered by our military forces.

With the present invention, the problem of flowering in punctured fuel lines has been overcome by the development of a self-sealing, multilaminated plastic fuel line having a particular structure and configuration. It is comprised of (a) a plastic fuel line made out of ballistic nylon cloth and an epoxy resin, (b) a precompressed and fuel sensitive foam bonded to the plastic fuel line, and (c) a flexible laminate bonded on top of the foam layer. This system was tested against .30 caliber AP and .50 caliber caliber AP projectiles and was found to seal efficiently with no flowering.

Accordingly, the primary object of this invention is to provide for a new and improved self-sealing aircraft fuel line.

Another object of this invention is to provide a multilaminated self-sealing plastic fuel line that does not flower when impacted by small arms ammunition.

Still another object of this invention is to provide a damage control and self-sealing system for aircraft fuel lines as well as protection from the damaging effects of .30 caliber AP and .50 caliber AP projectiles.

BRIEF DESCRIPTION OF THE DRAWING

In the drawing:

The FIGURE represents a side elevational view, partially fragmented, partially in cross-section, and in simplified schematic form of the non-flowering, self-sealing, plastic fuel line of this invention.

DESCRIPTION OF THE PREFERRED EMBODIMENT

The state-of-the-art technique for protecting conventional aluminum fuel lines is to wrap the lines with a self-sealing material similar to that used in self-sealing fuel cells or bladders. This technique often is less than satisfactory because the fuel line flowers when a fragment or projectile passes through it, and the flowering of the metal fuel line makes an open hole in the self-sealing material that does not seal. Furthermore, the high fuel line pressure in the line about 35 psi keeps the wound open and prevents the self-sealing system from acting.

In attempting to overcome this problem, it was believed that techniques already developed to reduce or eliminate catastrophic rupturing of aircraft integral fuel tank walls when impacted by AP and API projectiles would prove successful. These damage control systems prevent the flowering of the integral tank wall and allow the self-sealing systems to operate efficiently. One of the most successful self-sealing systems developed to date is the system using a precompressed and fuel sensitive foam for sealing in combination with a flexible ballistic nylon laminate as the damage control system. The ballistic nylon damage control system is essentially a high-tear-strength flexible laminate which prevents flowering of the integral metal tank wall.

However, the development of self-sealing systems for fuel lines presents more drastic problems than the similar development for integral fuel tanks. First, because the fuel lines are so small in diameter, flowering caused by projectile passage becomes a major problem. In a large integral tank wall, one foot square or larger, the wall motion can relieve the effect of the flowering; the exit wall moves outward with the projectile and the hydraulic ram pressures, and this motion relieves the tendency to flower. However, the small diameter, 2 to 3 inch fuel line is essentially rigid to the impact of a projectile or fragment. Flowering is drastic and is not relieved by the motion of the metal fuel line wall. Second, the self-sealing must be more rapid and of higher strength for the fuel line than for an integral fuel tank. The fuel line operates at a fuel line pressure of about 35 psi. This pressure produces liquid flow that tends to keep any fragment or projectile wound open, and prevents self-sealing materials from closing the wound. The self-sealing systems must be able to resist the effect of the 35 psi in the fuel line. As a consequence, the previously developed damage control technique referred to above was not successful in overcoming the problem of flowering with small diameter fuel lines.

Further exploratory development in accordance with this invention, however, has resulted in the fabrication of a non-flowering, self-sealing fuel line material that protects fuel lines against .30 and .50 caliber AP projectiles impacting at normal incidence as well as .30 caliber AP projectiles which impact in a tumbled condition. This was accomplished by providing a multi-laminated, self-sealing system composed of a plastic fuel line, a fuel sensitive self-sealing foam bonded to the line and a flexible laminate bonded to the foam.

In order to further illustrate the invention, reference is now made to the FIGURE in the drawing wherein the fuel line assembly includes a 2-ply ballistic nylon and epoxy resin impregnated fuel line 10 positioned adjacent to an aircraft fuel supply 12. For purposes of simplification, the fuel line is shown in a side elevational view rather than a conduit configuration. A ¼ inch thick fuel-sensitive, precompressed, natural rubber foam 14 is bonded to the fuel line 12. A flexible ballistic nylon laminate 16 is then bonded to the foam layer 14.

If the materials, design, and fabrication techniques are properly selected in the fabrication of the plastic fuel line, the resulting line should not flower or rupture, and should reduce the impact damage to a sealable hole or even seal the hole with a self-sealing system imbedded in the fuel line. Rigid, semi-flexibility of the lines will depend upon the plastic components used. It is believed that flexibility in the fuel line will enhance the protection efficiency of the fuel line. A very rigid plastic fuel line will tend to rupture or crack easily; a more flexible plastic fuel line will not rupture and will reduce the damage to a small sealable hole. Reinforcements such as high-strength cloth, high-strength filements, or high-strength metal wire, imbedded in the region, will vary and control the strength of the fuel line tubing. Keeping in mind the above considerations, series of plastic fuel lines were initially prepared and ballistically tested against .30 caliber AP projectiles.

In the ballistic test, each line was mounted in a test set-up which can be use either water as fuel as a circulating fluid through the line. When fuel is used, a recycling system is used. Recycling is performed by the help of a fuel pump. It is explosion proof and set at 35 psi g and 5 to 10 gallons per minute flow. This will maintain the fuel under pressure while flowering through the fuel line before, during and after testing the effects of impact by .30 and .50 caliber AP projectiles.

The fuel line 10 was made in lengths of 3.5 feet with a diameter of 2.5 inches for testing. An aluminum tube was used as a mold. Non-porous Armalon was wrapped around the tube as a mold release agent. Ballistic nylon layers were wrapped over the Armalon and then impregnated with a mixture of Epon 828, butly glycidyl ether and Versamid 125. The wet ballistic nylon was held in place by wrapping with polyvinyl alcohol plastic tape. The layup was then cured in an oven at 100° F. for 4 hours. After cure, the metal tube was separated from the plastic tube.

A 2½ inch diameter by 3½ foot long 2-ply ballistic nylon plastic fuel line was fabricated using the technique described above for preparing plastic fuel lines. The resin used was a mixture of Epon 828 and Versamid 125 (in a 2:1 ratio). Butyl glycidyl ether was added for thinning of the mixture and to allow better penetration of the mixture into the ballistic nylon cloth. Upon completion of the semi-flexible fuel line, half of the line length was covered with 1 ply of flexible ballistic nylon and the other half with 2 plies of flexible ballistic nylon laminate using polysulfide 898 as the impregnating sealant.

The gunfiring test was performed using the .30 caliber rifle with a 1-turn-per-10-inches rifling. The 2-ply epoxy plastic fuel line with the protective system (flexible laminate) bonded was mounted to the fuel line test setup. The water circulating system was used in this test with the water flow pressure set at 35 psi.

The first shot (.30 caliber AP) was fired into the section protected by 1 ply of the flexible composite at a 90° angle of incidence and 0° yaw. At the entrance, a pinhole size hole resulted, and on the inside of the line which was not protected, no fringing of nylon was noted. At the exit, the projectile left a ⅛ inch long slit with some fringing of nylon on the outside of the line and no fringing on the inside. The water flow pressure through the line dropped from 35 psi down to 29 psi. This, compared to test results on an unprotected 2-ply ballistic nylon plastic fuel line, is a 7 psi decrease in pressure drop. For more results see Table I.

| LINE CONT | PROTECTIVE SYS. USED DAMAGE CONTROL NON-SELF SEALING | SELF-SEALING | WEIGHT ADDED TO BARE LINE PER FT IN LBS. | TO BEAR LINE PER LINEAR FT. IN LBS | THICKNESS ADDED IN INCHES | PROJECTILE USED: CAL. AP | CONDITIONS OF PROJECTILE IMPACT |
|---|---|---|---|---|---|---|---|
| Z-1 Ratio of 828 epoxy resin to 125 versamid was 2:1 | Yes | None | 17 | 10 | 1/32 | 50 | Penetration of normal incidence in middle of line. |
| Z-2 Ratio of epoxy resin to 125 versamid was 2:1.3 | Yes | None | 17 | 10 | 1/32 | .50 | Penetrating at normal incidence in middle of line. |
| XY Ratio of 828 epoxy resin to 125 versamid was 2:1.5 | Yes | None | 34 | 21 | 1/14 | .50 | Penetrating at normal incidence in middle of line |
| XZ Ratio of 825 epoxy resin in | Yes | Yes | .49 | .30 | 5/16 | .30 | Penetrating at normal incidence in middle of line |

|  | PROTECTIVE SYS. USED | | WEIGHT ADDED | | | | |
| --- | --- | --- | --- | --- | --- | --- | --- |
| LINE CONT | DAMAGE CONTROL NON-SELF SEALING | SELF-SEALING | TO BARE LINE PER FT IN LBS. | TO BEAR LINE PER LINEAR FT. IN LBS | THICKNESS ADDED IN INCHES | PROJECTILE USED: CAL. AP | CONDITIONS OF PROJECTILE IMPACT |
| 125 versamid was 2:1.5 | | | | | | | |

|  | BALLISTIC TESTS | | |
| --- | --- | --- | --- |
|  | INITIAL WATER ON FUEL PRESS. IN LINE (PSI) | FULL OR WATER PRESS. RECORDED AFTER IMPACT (PSI) | REMARKS |
| Z-1 Ratio of 828 epoxy resin to 125 versamid was 2:1 | 35 | 29 | At entry, a pinhole size hole occurred and on inside no fringing of nylon was noted. At exit, a ⅜" tight slit was experienced A similar line but with a 2-ply laminate instead of a 1-ply laminate was ballistically tested. Results were similar to 1-ply laminate protection except that flow pressures dropped to 32 psi only |
| Z-2 Ratio of epoxy resin to 125 versamid was 2:1.2 | 35 | 32 | Pinhole size holes were observed at entry and exit. Leakage was small. |
| XY Ratio of 828 epoxy resin is 125 versamid was 2:1.5 | 35 | 35 | Pinhole size holes occurred at at entry and exit. Leakage was small. |
| XZ | 35 | 33 | Pinhole size holed occurred at entry and exit. Leakage was small. |
| XZ Ratio of 828 epoxy resin to 125 versamid was 2:1.5 | 35 | 35 | Pinhole size holes were noted. No leakage and sealing was immediate. A similar line tested against .50 cal. AP projectile gave practically the same results. The only exception was that sealing occurred within 1 to 2 minutes. |

The .30 caliber AP shot into the section protected by the 2-ply outer cover at a 90° angle of incidence and 0° yaw showed, again, a small hole at the entry of the line and no fringing of nylon on the inside of the line. At the exit, a ⅜ inch long slit occurred with no fringing of nylon on the inside or outside of the line. The water flow pressure dropped from 35 psi down to 32 psi. See line configuration Z-1 of Table I.

In another series of tests, two types of protected 2-ply ballistic nylon plastic fuel lines were prepared using the more flexible plastic fuel lines (epoxy/Versamid ratio of 2:1.5). In one case a 1-ply flexible ballistic nylon laminate (using 898 sealant as the impregnating resin) was wrapped around on the outside of the lines and bonded to the lines using 898 sealant material. In the other case, a 1-ply flexible ballistic nylon laminate (using 898 sealant as the impregnating resin) was wrapped around the outside and the outside of the lines and bonded with 898 sealant. In the latter case, the fabrication technique was as follows: an aluminum tube (O.D. of 2½ inches) was used as the mold. Non-porous Armalon was wrapped around the tube as the mold releasing agent. A measured 1-ply flexible ballistic nylon laminate was wrapped over the Armalon. The two ends (overlapping by 1 inch) of the 1-ply laminate were bonded together using 898 sealant under pressure at 180° for 1½ hours. After bonding of the 1-ply laminate the impregnated ballistic nylon layers (two) with the mixture of Epon 828, butyl glycidyl ether, and Versamid 125 (a ratio of 2:1.5) were wrapped over the 1-ply laminate. The wet ballistic nylon cloth was held in place and bonded to the laminate by wrapping with polyvinyl alcohol plastic tape (to apply pressure). The layup was cured in an oven at 180° F. for 1½ hours. After cure, a 1-ply flexible ballistic nylon laminate (using 898 sealant as the impregnating resin) was wrapped around the outside of the lines and bonded to the lines using 898 sealant material which was cured at 180° F. for 1½ hours.

Ballistic tests were conducted with these protected lines similar to the ones conducted with the unprotected lines. The results obtained showed that the protected lines performed very well and particularly the lines protected on the inside and outside showed very promising results. In all cases, the damage was low and the water flow pressure through the fuel line after the shots dropped only from 35 psi down to 32–33 psi. The detailed results are given in Table I. The line configuration Z-2 is the line with a 1-ply flexible laminate bonded on the outside of the plastic line and configuration XY is the line with a 1-ply flexible laminate bonded on the outside of the plastic line and configuration XY is the line with a 1-ply flexible laminate bonded on the outside and inside of the plastic line.

A different type of protective system for plastic fuel lines was also fabricated and tested. In it a layer of foam is utilized as an additional damage control system and/or a self-sealing system as shown in the drawing. A 2-ply ballistic nylon plastic tube using this type system was prepared using the technique described above. A ¼-inch layer of natural rubber foam sheet was wrapped around the plastic tube and bonded using 898 polysulfide sealant. The foam was put under precompression. A layer of ballistic nylon cloth impregnated with 898 sealant was wrapped over the natural rubber foam layer and kept in place with a wrap of porous Armalon. The layup was cured in an oven at 100° for 4 hours with the foam layer 14 sandwiched between the plastic line 10 and the flexible laminate 16. Results of testing this particular configurations as shown at line configuration XZ of Table I.

The completed line, illustrated in the FIGURE of the drawing was mounted to the fuel line test setup. The water circulating system was used in this test, with the water flow pressure set at 35 psi. A .30 caliber AP projectile was fixed at a 90° angle of incidence and 0° yaw. The damage which occurred at both the entrance and exit sides was only a pinhole size hole with no fringing of nylon. Upon impact, the line pressure dropped slightly (as witnessed on a high-speed motion picture) but returned to the initial pressure of 35 psi within a short period of time indicating sealing of the puncture. A similar test was conducted with a similar protected plastic line with the only exception that fuel ws used instead of water as the circulating fluid. In this case, the natural rubber foam performed even better inasmuch as sealing was obtained by both the precompression of the foam and the swelling of the form in contact with the fuel.

From a consideration of the foregoing, it can be seen that the present invention provides a new and improved self-sealing fuel line composite. These fabric reinforced, laminated fuel lines employing compressed natural rubber foam as a sealant successfully sealed wounds inflicted by .30 and .50 caliber projectiles. The weight of these fuel line composites range from 0.83 to 0.128 lbs/ft$^2$ as compared to the 2.59 lbs/ft$^2$ weight of a standard aluminum fuel line provided with a conventional self-sealing cover capable of sealing wounds inflicted by a .50 caliber projectile.

Although the invention has been described by reference to particular embodiments thereof, it is to be understood by those skilled in the art that all the various modifications and alterations that fall within the scope of the appended claims are intended to be included herein.

What is claimed is:

1. A multi-laminated composite material for use in aircraft self-sealing fuel line systems comprising:
   (a) a first layer of ballistic nylon impregnated with a cured epoxy resin mixture;
   (b) a second layer of ballistic nylon impregnated with a polysulfide resin sealant; and
   (c) a third layer interdisposed between and bonded to said first and second layers and composed of a precompressed, natural rubber, fuel sensitive foam.

2. A multi-laminated composite in accordance with claim 1 wherein said first layer is composed of a 2-ply ballistic nylon material.

3. A multilaminated composite in accordance with claim 2 wherein said second layer is composed of a one ply ballistic nylon material.

* * * * *